Sept. 9, 1941.   R. J. CARBARY   2,255,503
VENTILATED FOOD STORAGE RECEPTACLE
Filed Oct. 26, 1939
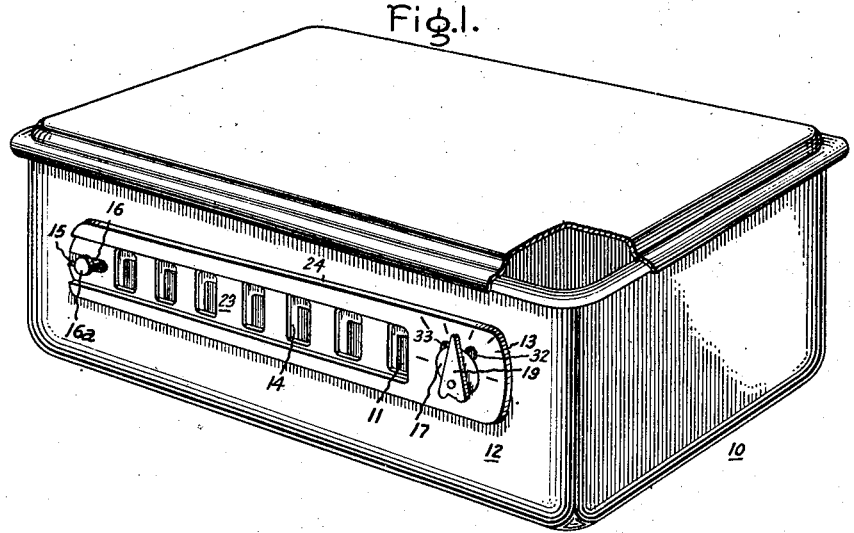
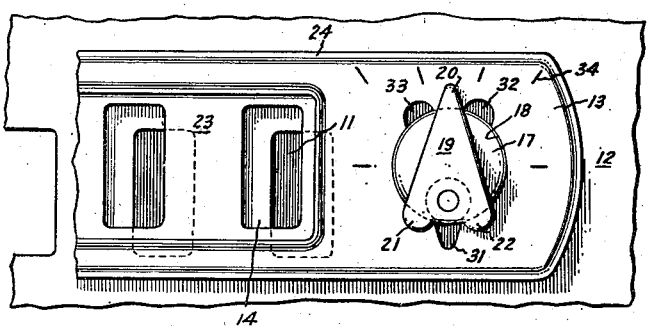
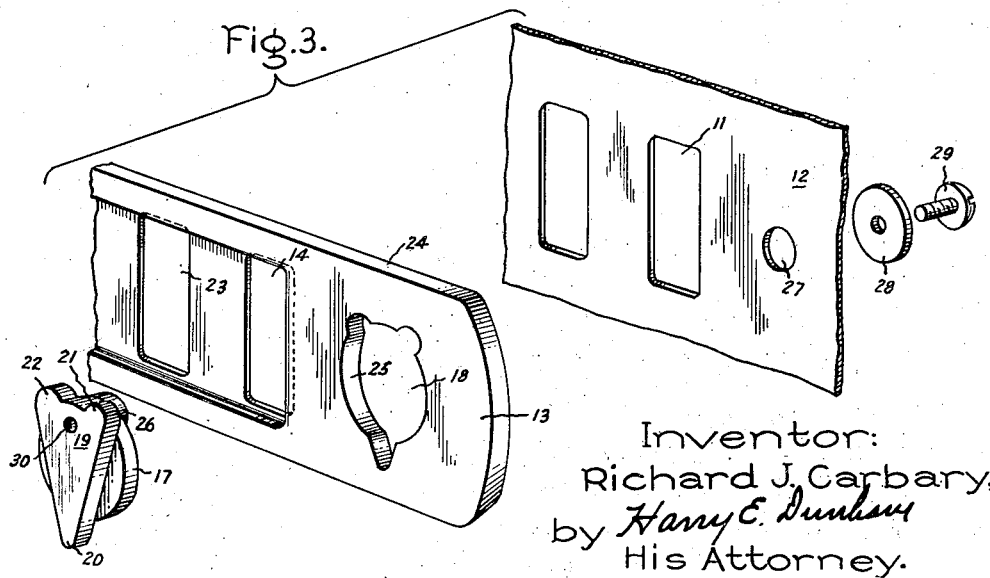
Inventor:
Richard J. Carbary,
by Harry E. Dunham
His Attorney.

Patented Sept. 9, 1941

2,255,503

UNITED STATES PATENT OFFICE 2,255,503

VENTILATED FOOD STORAGE RECEPTACLE

Richard J. Carbary, Erie, Pa., assignor to General Electric Company, a corporation of New York Application October 26, 1939, Serial No. 301,433

8 Claims. (Cl. 98—51)

My invention relates to ventilators for food storage receptacles and more particularly to ventilators for food storage receptacles adapted for use with refrigerators of the domestic type.

It is an object of my invention to provide a new and improved ventilating arrangement for food storage receptacles which is readily and easily manipulated to vary the amount of ventilation.

Another object of my invention is to provide a ventilator for a food storage receptacle in which the component parts are positively held in assembled relation whereby there is no tendency for the component parts to fall apart but the members may be moved to a position in which they are readily separable.

It is also an object of my invention to provide a ventilator for a food storage receptacle in which the component parts have operative and separable positions.

Further objects and advantages of my invention will become apparent as the following description proceeds and the features of novelty which characterize my invention will be pointed out with particularity in the claims annexed to and forming a part of this specification.

For a better understanding of my invention reference may be had to the accompanying drawing in which Fig. 1 is a perspective view of a food storage receptacle embodying the principles of my invention; Fig. 2 is an enlarged partial view of details of the food storage receptacle illustrated in Fig. 1; and Fig. 3 is an exploded perspective view illustrating parts of the receptacle shown in Fig. 1.

I have provided a food storage receptacle 10 having ventilating openings 11 in a wall 12 thereof. In order to vary the amount of ventilation through the openings 11, I have provided a ventilating slide 13 having openings 14 arranged to cooperate with the openings or apertures 11 in the wall 12. In order to move the ventilating slide or member 13 to vary the size of the opening, I have provided a slot 15 in one end of the member 13 so that the member 13 may be slidably supported by a stud 16 suitably secured to the wall 12 of the receptacle 10 and at the other end of the member 13 a cam 17 fitting within an opening 18 in the member 13. Rotation of the cam 17 causes the member 13 to move or slide on the stud 16 thereby forming ventilating openings of different areas.

In order to provide a positive assembly of the component parts in which there is no tendency to fall apart in the operative position but which is readily disassembled for cleaning, etc., I have provided a handle or actuating knob 19 having portions 20, 21 and 22 which extend beyond the outer edge of the cam 17. The opening 18 is shaped to permit the unobstructed passage of the member 13 over the handle 19 and cam 17 in the separable position of the handle 19 as best seen in Fig. 3, but the opening 18 and the handle portions 20, 21 and 22 are so arranged that with the handle 19 turned to its operative position, as shown in Fig. 2, there is no tendency of the parts to fall apart, whereby the knob and the opening or aperture are modified or provided with cooperating means on adjacent faces in order to provide for unobstructed placement or withdrawal of the movable member over the cam member and the knob in one position of the knob but maintenance of the parts in assembled relation in substantially all other positions of the knob.

Describing my invention in greater detail, I have provided a ventilator for a receptacle 10 having a stationary member which in this case is the wall 12 of the receptacle 10 with a plurality of openings 11 illustrated in the form of parallel substantially rectangular slots extending transversely of the wall 12. The ventilating slide or member 13 is substantially rectangular in shape and is provided with a plurality of spaced-apart slots 14 similar in shape and position to the openings 11. The upper and lower edges and the right-hand end of the member 13, as viewed in the drawing, are raised with respect to the portions 23 adjacent the openings 14. The raised portions are provided with an inwardly extending flange 24 which is arranged to slidably engage the side wall 12 of the receptacle 10. The flange 24 is dimensioned so that the depressed portions 23 are closely adjacent the wall 12 of the receptacle 10 so that the leakage of air between the interior and exterior of the receptacle when the openings 11 are covered by the portions 23 will be minimized.

In order to movably support the slide 13 the edge of the opening 18 is provided with an inwardly extending collar or flange 25 which serves as a cam surface for operative engagement with the edges of cam 17 when the parts are in their assembled relationship. The cam 17 and knob 19 suitably attached thereto are supported on the wall 12 by means of an eccentrically located arm 26 suitably secured to the cam 17, the arm 26 passing through a suitable opening 27 in the wall 12 of the receptacle 10. I have provided a washer 28 and threaded fastening member 29 for securing the cam in place, the threaded stem of the member 29 passing through the opening in the washer 28 for engagement with a suitably threaded opening 30 extending through arm 26, cam 17 and knob 19. The arm 26 is of such a length as to extend into the interior of the receptacle 10 allowing a slight amount of play between the inner face of the cam 17 and the wall 12. The slide 13 is supported at the other end thereof by the stud 16 which fits within slot 15 formed in the slide 13. In order to retain the slide 13 on the stud 16, the stud 16 is provided with an enlarged head 16a of greater diameter than the width of slot 15.

In order to provide a positive assembly of the various component parts having no tendency to fall apart, I have provided a handle 19 with portions 20, 21 and 22 extending beyond the periphery of the cam 17. I have illustrated a generally heart-shaped or triangularly-shaped knob 19 which may be made of any suitable material and may be integral with cam 17 or separable therefrom as desired. The opening 18 is provided with secondary openings 31, 32 and 33 having the same shape as and being slightly larger than the projections 20, 21 and 22 of the knob 19 respectively. In assembling the parts of the ventilator, the cam 17 is secured to the outside of the receptacle 10 by passing the arm 26 through the opening 27 and then applying the washer 28 and member 29 thereto. With the handle member 19 in the position shown in Fig. 3, the slide 13 is then moved across the surface of wall 12 until the slot 15 engages the stud 16 and the openings 31, 32 and 33 match with the portions 20, 21 and 22 respectively of the knob 19. The slide 13 may then be passed inwardly over the projecting portions of the knob 19 until the flange 24 and the depressed portions 23 of the member 13 engage the wall 12 of the receptacle. The knob 19 may then be rotated in either direction until the portions 20, 21 and 22 are out of correspondence with the openings 31, 32 and 33, as for example in the positions shown in Figs. 1 and 2. In order to disassemble the parts the procedure may be reversed, that is, knob 19 may be turned until the projections 20, 21 and 22 correspond with the secondary openings 31, 32 and 33, in which position the slide 13 has unobstructed passage over the cam 17 and knob 19. The slide 13 may then be withdrawn longitudinally of the stud 16 until the member 13 is entirely free of the stud 16.

In order to vary the amount of ventilation permitted between the interior and exterior of the receptacle 10, the knob 19 will be turned. As shown in Fig. 2, the parts are designed so that with the pointer portion 20 of the knob 19 in the uppermost position the openings 11 are approximately half uncovered. In this position, the major portion of cam 17 is above the eccentric arm 26. Now, if the knob is turned in a counterclockwise direction, the cam 17 and knob 19 will rotate with the arm 26 as a pivot thereby urging the slide 13 toward the left because of the cooperation of the inner cam surface of the opening 18 and the outer edge of the cam 17 while, if the knob 19 is turned toward the right, the slide 13 will be urged toward the right to uncover more of the opening 11.

Reference indicia, as indicated by the numeral 34, may be provided to indicate the degree of uncovering of openings 11.

While I have shown a particular embodiment of my invention, I do not desire my invention to be limited to the particular construction shown and described and I intend in the appended claims to cover all modifications within the spirit and scope of my invention.

What I claim as new and desire to secure by Letters Patent of the United States, is:

1. A ventilating louver comprising a stationary apertured member, a movable apertured member cooperating with said stationary member for providing a variable ventilating opening, said movable member having an opening, a cam member carried by said stationary member and disposed in said opening, an actuating knob operatively associated with said cam member, said cam being so arranged that the turning force applied to said knob is transmitted through said cam to said movable member for moving the latter to vary the area of said ventilating opening, said knob and said opening in said movable member having cooperating means on adjacent faces to provide for unobstructed placement or withdrawal of said movable member over said cam member and said knob in one position of said knob but for maintaining the parts in assembled relationship in substantially all other positions of said knob, and means for guiding said movable member.

2. A ventilating louver comprising a stationary apertured member, a movable apertured member cooperating with said stationary member for providing a variable ventilating opening, said movable member having an opening, a cam member carried by said stationary member and disposed in said opening, an actuating knob operatively associated with said cam member, said cam being so arranged that the turning force applied to said knob is transmitted through said cam to said movable member for moving the latter to vary the area of said ventilating opening, said knob having portions extending beyond the edges of said cam member, said opening having a contour permitting unobstructed placement or withdrawal of said movable member over said cam member and said knob in one position of said knob, and means for guiding said movable member.

3. A ventilating louver comprising a stationary apertured member, a movable apertured member for uncovering said first-mentioned apertures, said movable member having a raised marginal portion, said movable member having an opening at one end thereof, said opening being located in said raised portion, an inturned flange around said opening, a cam member in said opening, an eccentrically located arm on the side of said cam member presented toward said stationary member for pivotal movement thereon, and an actuating knob on the other side of said cam member, said cam and said flange being arranged for operative engagement whereby the turning force applied to said knob is transmitted through said cam to said movable member for moving the latter to vary the uncovered area of the apertures in said stationary member, and means for guiding said movable member.

4. A ventilating louver comprising a stationary apertured member, a movable apertured member for uncovering said first-mentioned aperture, said movable member having a raised marginal portion, said movable member having an opening at one end thereof, said opening being located in said raised portion, an inturned flange around said opening, a cam member in said opening, an eccentrically located arm on the side of said cam member presented toward said stationary member, said arm being supported by said stationary member for pivotal movement thereon, and an actuating knob on the other side of said cam member, said cam and said flange being arranged for operative engagement whereby the turning force applied to said knob is transmitted through said cam to said movable member for moving the latter to vary the uncovered area of the aperture in said stationary member, the other end of said movable member having a slot and a stud on said stationary member for engagement with said slot.

5. A ventilating louver comprising a stationary apertured member, a movable apertured member for uncovering said first-mentioned apertures, said movable member having a raised marginal portion, said movable member having an opening at one end thereof, said opening being located in said raised portion, an inturned flange around said opening, a cam member in said opening, an eccentrically located arm on the side of said cam member presented toward said stationary member, said arm being supported by said stationary member for pivotal movement thereon, and an actuating knob on the other side of said cam member, said cam and said flange being arranged for operative engagement whereby the turning force applied to said knob is transmitted through said cam to said movable member for moving the latter to vary the uncovered area of the apertures in said stationary member, said knob having portions extending beyond the edges of said cam, said extending portions serving to hold the parts in assembled relationship in the operative positions of said knob, said opening having a contour permitting unobstructed placement or withdrawal of said movable member over said cam and said knob in one position of said knob, and means for guiding said movable member.

6. A food storage receptacle having a plurality of openings in a wall thereof, a substantially rectangular plate having a plurality of openings adapted to cooperate with said first-mentioned openings for permitting ventilation of said receptacle, a knob movably mounted on said receptacle for rotary motion with respect thereto, said plate having an aperture therein, the contour of said aperture being arranged to permit unobstructed placement or withdrawal of said plate over said knob, cam means associated with said knob and said aperture for moving said plate, a slot in said plate, and means including a stud supported by said receptacle and adapted to cooperate with said slot in said plate for slidably mounting said plate on said receptacle so that the openings in said receptacle and said plate may be moved into and out of alignment to form ventilating openings of variable amount.

7. A receptacle having a plurality of parallel slots extending transversely of a wall thereof, a substantially rectangularly shaped plate having a width slightly greater than the width of said slots, said plate having a rectangularly-shaped depressed portion closely adjacent said wall of said receptacle, said plate being provided with a plurality of parallel slots extending transversely of said depressed portion and adapted to cooperate with said first-mentioned slots to form ventilating openings of variable size, and means for detachably mounting said plate on said receptacle including a slot in one end of said plate and a stud attached to said receptacle and arranged to engage said slot, a flange defining an aperture in the other end of said plate, a cam in said aperture and an operating knob on said cam, said aperture being shaped to permit unobstructed placement or withdrawal of said plate over said cam and said knob, said cam and said flange cooperating for slidably moving said plate longitudinally on said stud to cause said openings to be moved into and out of alignment.

8. A food storage receptacle provided with a plurality of ventilating openings, a plate movably and adjustably mounted on said receptacle, said plate having a plurality of ventilating openings corresponding to the openings in said receptacle, a knob rotatably mounted on said receptacle, said plate having an opening therein at one end thereof, said opening being shaped to permit unobstructed placement or withdrawal of said plate over said knob, said plate being provided with a slot at the other end thereof, said receptacle being provided with a stud for engagement with said slot, and means for sliding said plate on said stud including a cam associated with said knob and arranged to engage an edge of said opening whereby said plate is moved to vary the area of the openings in said receptacle.

RICHARD J. CARBARY.